(12) United States Patent
Wong et al.

(10) Patent No.: US 9,430,751 B2
(45) Date of Patent: Aug. 30, 2016

(54) METHOD, SYSTEM AND APPARATUS FOR GENERATION OF LOT CODES AND EXPIRY DATES

(75) Inventors: Kevin Nelson Wong, Toronto (CA); Sean Sebastian Kirby, Toronto (CA); Jason Yuen, Toronto (CA); Syed Ahmed Hussaini, Markham (CA); Victor Savkin, Toronto (CA); Mohanad Yajouri, Toronto (CA)

(73) Assignee: NULOGY CORPORATION, Toronto, Ontario (CA)

( * ) Notice: Subject to any disclaimer, the term of this patent is extended or adjusted under 35 U.S.C. 154(b) by 1111 days.

(21) Appl. No.: 13/449,466

(22) Filed: Apr. 18, 2012

(65) Prior Publication Data

US 2013/0254077 A1    Sep. 26, 2013

Related U.S. Application Data

(60) Provisional application No. 61/614,676, filed on Mar. 23, 2012.

(51) Int. Cl.
*G06Q 10/00* (2012.01)
*G06Q 99/00* (2006.01)
*G06Q 10/08* (2012.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| | | | |
|---|---|---|---|
| 6,601,233 B1 | 7/2003 | Underwood | |
| 8,452,785 B1 * | 5/2013 | Iida | G06Q 30/0601 705/26.7 |
| 8,468,054 B1 * | 6/2013 | Espinoza | G06Q 10/00 235/381 |
| 2006/0161888 A1 | 7/2006 | Lovisa et al. | |
| 2007/0180248 A1 * | 8/2007 | Gorostidi | G06Q 20/3674 713/173 |
| 2008/0128518 A1 * | 6/2008 | Kubota et al. | 235/493 |
| 2008/0133309 A1 * | 6/2008 | Maggio | 705/9 |
| 2009/0037283 A1 * | 2/2009 | Anderson | G06Q 10/087 705/15 |
| 2009/0077532 A1 | 3/2009 | Denny et al. | |
| 2012/0109842 A1 * | 5/2012 | Bhatt | G06Q 10/0833 705/333 |
| 2013/0024387 A1 * | 1/2013 | Dillon | G06Q 10/0833 705/317 |

FOREIGN PATENT DOCUMENTS

WO    2010060466 A1    6/2010

OTHER PUBLICATIONS

International Search Report of corresponding PCT Application No. PCT/CA2013/000276; mailing date Jul. 12, 2013.
Written Opinion of the International Searching Authority of corresponding PCT/CA2013/000276; mailing date Jul. 12, 2013.

\* cited by examiner

*Primary Examiner* — Ariel Yu
(74) *Attorney, Agent, or Firm* — Kristjan Spence; Perry + Currier Inc.

(57) ABSTRACT

According to embodiments described in the specification, a method, system and apparatus for code and expiry date generation are provided. The method comprises receiving a request to generate a code at the processor; automatically selecting one of a plurality of code generation rules from the memory based on an item identifier derived from the request, the selected rule including one or more code fragment definitions; retrieving data from at least one reference table stored in the memory, based on the code fragment definitions; generating the one or more code fragments according to the selected rule using the retrieved data; and concatenating the generated code fragments to generate the code.

18 Claims, 13 Drawing Sheets

212

CG1

| | 600 | 604 |
|---|---|---|
| Order | 1 | 2 |
| Fragment Name | Date fragment | Site fragment |
| Fragment Data Type | Subcomponent date of manufacture | Site of production |
| Reference Table | Calendar date table | Site code table |
| Reference Column | YWW | Code |
| Length | 3 | 3 |

Figure 6

Date Table Definition

New Column — 1104

| Date | YWW | YJJJ |
|---|---|---|
| January 1, 2012 | 201 | 2001 |
| January 2, 2012 | 201 | 2002 |
| ... | ... | ... |
| January 5, 2012 | 201 | 2005 |
| ... | ... | ... |
| April 4, 2012 | 214 | 2095 |

Figure 11

METHOD, SYSTEM AND APPARATUS FOR GENERATION OF LOT CODES AND EXPIRY DATES

FIELD

The specification relates generally to lot codes and expiry dates used in the manufacturing and packaging of goods, and specifically to a method, system and apparatus for the generation of such codes.

BACKGROUND

Manufactured products can be assigned lot codes and expiry dates to enable tracking of such products, particularly in the case of foods and medical goods. Such lot codes can be derived from the lot codes of components used in the manufacture of the products, and the date of manufacture. However, a wide variety of components and component lot codes can be encountered in a given manufacturing facility, depending on what is being manufactured or packaged at a given time, and on behalf of which entity the manufacturing or packaging is being undertaken. Current efforts to automate the generation of lot codes and expiry dates make inefficient use of computing resources and personnel.

BRIEF DESCRIPTIONS OF THE DRAWINGS

Embodiments are described with reference to the following figures, in which:

FIG. 6 depicts a code rule definition of the application of FIG. 2, according to a non-limiting embodiment;

Figure 1:
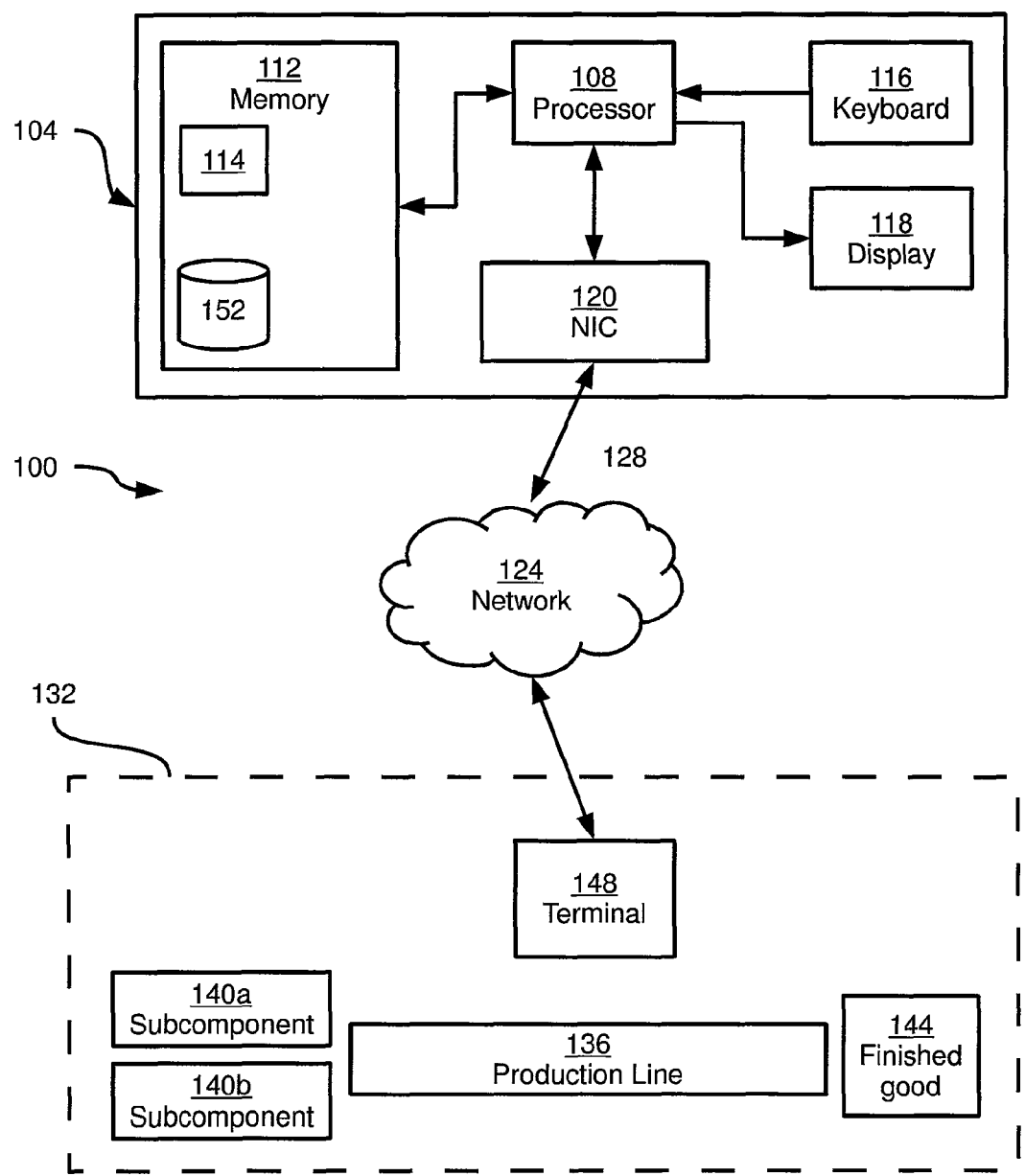
FIG. 1 depicts a system for generating lot codes and expiry dates, according to a non-limiting embodiment.
Figure 3:
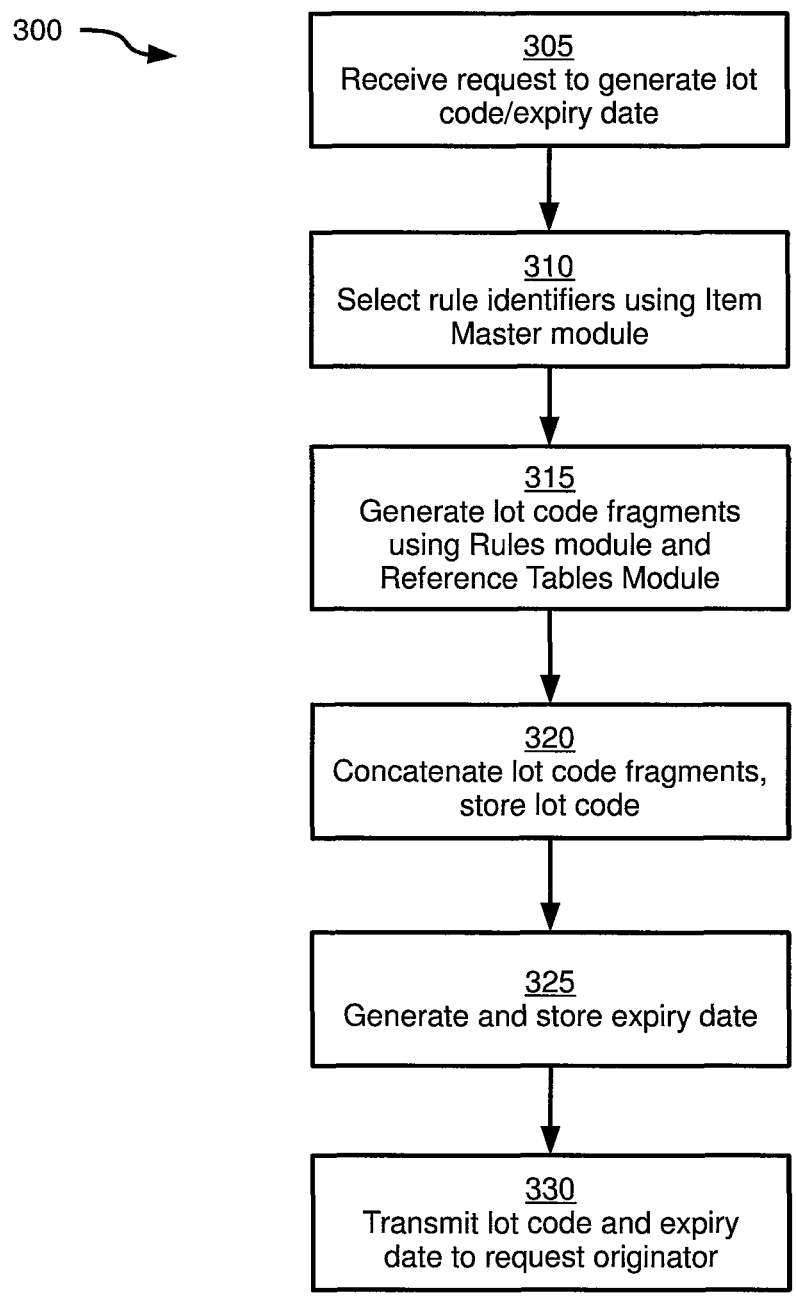
FIG. 3 depicts a method for generating lot codes and expiry dates, according to a non-limiting embodiment.
Figure 12:
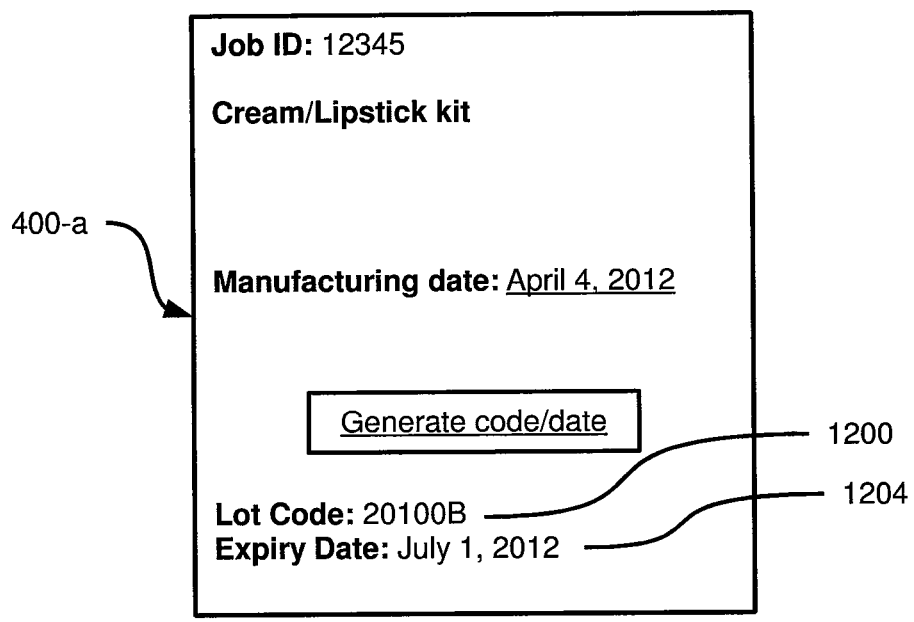
Figure 13:
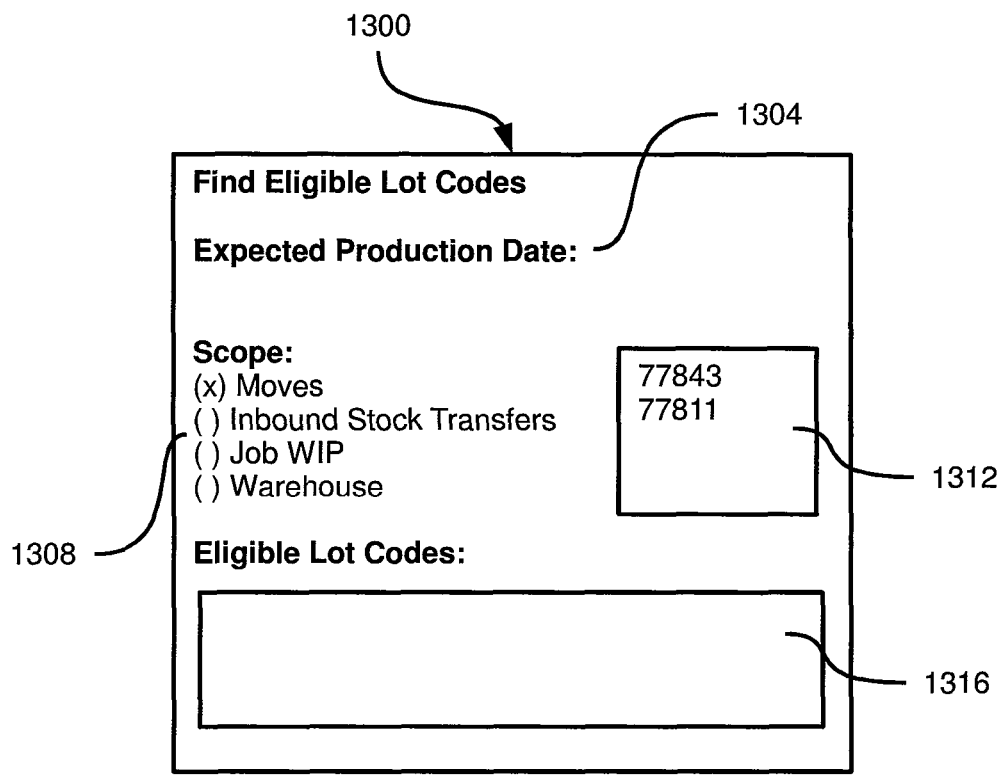

FIG. 11 depicts a table definition interface provided to the terminal of FIG. 1, according to a non-limiting embodiment; and FIG. 12 depicts an interface provided to the terminal of FIG. 1 following the performance of the method of FIG. 3, according to a non-limiting embodiment FIG. 13 depicts an interface provided to the terminal of FIG. 1 for specifying a scope for the performance of the method of FIG. 3, according to a non-limiting embodiment.

DETAILED DESCRIPTION OF THE EMBODIMENTS

FIG. 1 depicts a schematic representation of a system 100 for managing the production of goods. System 100 includes a server 104, which can be based on any known server architecture, and thus generally includes one or more enclosures housing one or more processors, along with associated memories and communications interfaces.

In the example shown in FIG. 1, server 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Memory 112 also maintains computer-readable instructions executable by processor 108. Such instructions include, for example, an operating system and one or more applications. One such application shown in FIG. 1 is a lot code and expiry date generation application 114 (referred to as "application 114" herein). Processor 108, via execution of the instructions contained within application 114, is configured to carry out various actions, as will be discussed below. It is contemplated that application 114 can be maintained on other non-transitory computer readable media than memory 112, such as optical media, flash media and the like.

Server 104 can also include input and output devices interconnected with processor 108, such as a keyboard 116 and a display 118, respectively. It is contemplated that other input and output devices can also be used with server 104, including, for example, touch screens, speakers, microphones and the like. In some examples (not shown), keyboard 116 and display 118 can be omitted and server 104 can instead be administered from an additional terminal, such as a personal computer with associated input and output devices, connected with server 104. Such a terminal can be located, for example, within the same facility as server 104. In other examples, such a terminal can be located remotely from server 104 and can interact with server 104 over a Wide Area Network ("WAN") such as the Internet. Terminals can include desktop computers as well as various mobile computing devices, such as laptop computers, mobile phones, tablet computers and the like.

Server 104 also includes a network interface controller (NIC) 120, also referred to herein as a communications interface, for connecting server 104 to a network 124 via a link 128. Network 124 can include any suitable combination of wired and/or wireless networks, including but not limited to a WAN such as the Internet, a Local Area Network ("LAN"), cell phone networks, WiFi networks, WiMax networks and the like. Link 128 can therefore be selected for compatibility with NIC 120 and network 124. In the present example, link 128 is a wired link (e.g. an Ethernet-based link). However, it is also contemplated that in some examples, link 128 can be a wireless link with NIC 120. In such examples, link 128 will be understood as also including any necessary backhaul links with network 124.

In general, server 104 is configured to process data representing inventory for a production site 132. Production site 132 is generally housed within a particular facility, such as a manufacturing facility. It will be understood, however, that production site 132 can include a plurality of facilities (for example, several warehouse-type buildings). In some examples, each of the facilities can be operated by the same entity, although this is not strictly necessary. It is contemplated that although server 104 and network 124 are not shown within production site 132, in some embodiments server 104 can be located within production site 132 and network 124 can be, for example, a LAN at production site 132.

Production site 132 includes one or more production lines, such as a production line 136, which can include various equipment necessary for the conversion of subcomponents 140 into finished goods 144. It will be appreciated that various types of subcomponents 140 can be combined and otherwise manipulated at production line 136 to produce various types of finished goods. In the example of FIG. 1, subcomponents 140a and 104b (generically referred to as subcomponents 140) are combined at production line 136 to produce finished good 144. The nature of subcomponents 140 and finished goods 144 is not particularly limited.

System 100 also includes one or more terminals 148 connected to network 124 and in communication with server 104. Terminal 148 comprises a computing device, having an enclosure housing a processor and a memory, as well as input devices (e.g. a keyboard, a mouse, a barcode scanner) and output devices (e.g. a display). In some examples, a touch screen (providing both input and output functionality) can be provided instead of, or in addition to, the above-mentioned input and output devices. It is contemplated that terminal 148 can be any one of a tablet computer, bar-code scanning terminal, desktop computer, laptop computer, smart phone, and the like. Terminal 148 can be physically coupled to an apparatus within production site 132, such as production line 136 or a vehicle (e.g. a forklift) used to move inventory. In other examples, terminal 148 can be free to travel across production site 132. Terminals having any suitable combination of the above features can be provided.

Terminal 148 receives input data representing physical movements of inventory (whether subcomponents 140 or finished goods 144) at production site 132, as well as input data representing the conversion of subcomponents 140 into finished goods 144. The nature of such data is not particularly limited, and can include quantities of inventory and locations of inventory within production site 132, scheduling information for when a job (being a conversion of subcomponents 140 into finished good 144) is to take place and at which production line 136 it will take place, and the like. Terminal 148 transmits the input data (or data representative of the input data) to server 104 for storage and processing at server 104. Terminal 148 can also receive data from server 104, such as the results of the above-mentioned processing by server 104.

Server 104 maintains a data store 152 for storing the data received from terminal 148, data received as input from devices such as keyboard 116, and data generated automatically (for example, based on the above-mentioned data received from terminal 148 or keyboard 116) by processor 108. Further discussion of the contents of data store 152 and the processing operations carried out thereon at server 104 is provided in U.S. Published Application No. 2011/0251865, and in U.S. patent application Ser. No. 12/983,060, the contents of both of which are incorporated herein by reference. In general, the operations performed by server 104 based on the data received from terminal 148 and keyboard 116 allow server 104 to maintain an accurate representation of the inventory levels of various subcomponents 140 and finished goods 144 at production site 132.

Data contained in data store 152, along with additional data to be discussed below, can also be used at server 104, via the execution of application 114, to generate lot codes and expiry dates for finished goods 144. Such lot codes and expiry dates can be used, for example, to print labels for finished goods 144 and to track such finished goods electronically after their departure from production site 132 (in case a recall of finished goods is required, for example). The generation of lot codes and expiry dates at server 104 will be discussed below in greater detail.

Figure 2:
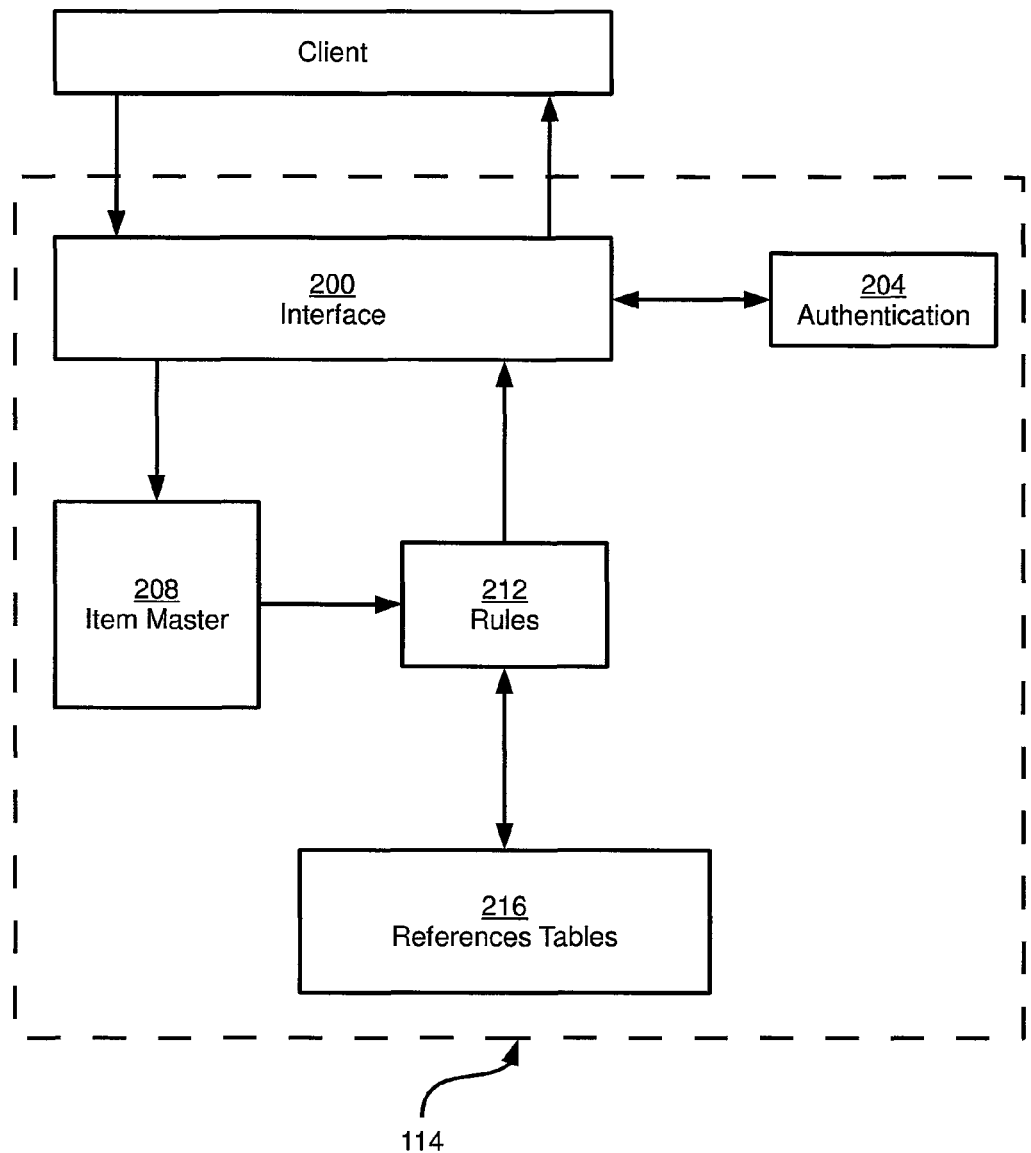
FIG. 2 depicts a schematic block diagram of an application executed by the server of FIG. 1, according to a non-limiting embodiment.

Turning to FIG. 2, a schematic representation of certain components of application 114 is shown. Application 114 includes an interface module 200, an authentication module 204, an item master module 208, a rules module 212, and a reference tables module 216. The above-mentioned modules will be described in greater detail below, in terms of data contained within such modules and operations performed by processor 108 executing such modules. It is contemplated that application 114 includes the necessary computer readable instructions to enable processor 108 to maintain and access that data in memory 112 and perform those operations. Thus, when processor 108 is described below as being configured to perform certain operations using a module of application 114, it is contemplated that processor 108 is so configured via the execution of computer readable instructions corresponding to the functionality described below in connection with that module. The coding of such computer readable instructions in light of this specification is within the skill of a person skilled in the art.

Turning now to FIG. 3, the above-mentioned modules of application 114 will be discussed in greater detail in connection with a method for generating lot codes and expiry dates, indicated generally at 300. For the discussion of an example performance of method 300, it will be assumed that lot codes and expiry dates are to be generated for use on labels for a finished good 144 comprising a kit of a unit of moisturizing cream, and a unit of lipstick. Thus, subcomponent 140a comprises units of cream, while subcomponent 140b comprises units of lipstick.

Beginning at block 305, server 104 is configured to receive a request to generate a lot code and/or an expiry date. In the present example performance of method 300, it will be assumed that the request received at block 305 is a request to generate both a lot code and an expiry date. The request can be received at processor 108 using interface module 200, via NIC 120. Interface module 200 can, for example, provide a web site including a plurality of web pages through which terminal 148 can submit the request.

Figure 4:
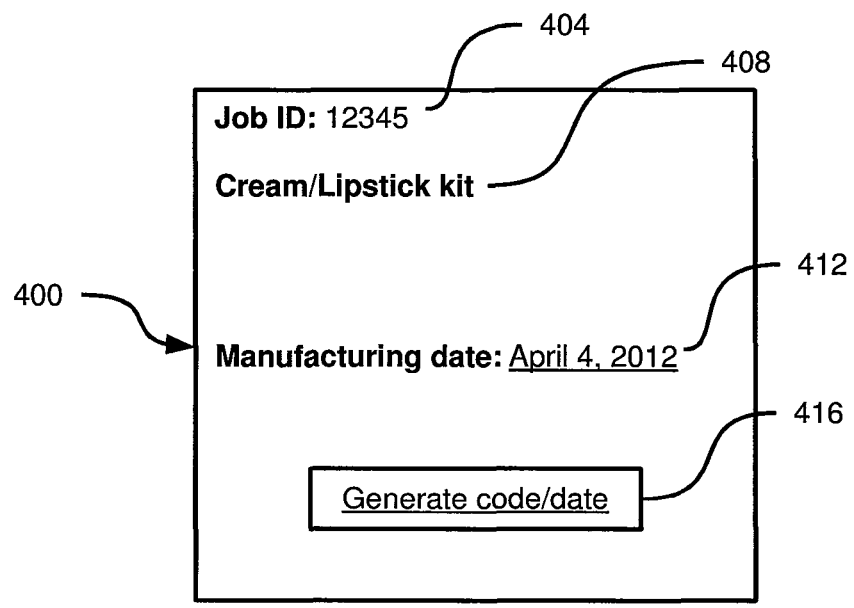
FIG. 4 depicts a request interface provided to the terminal of FIG. 1, according to a non-limiting embodiment.

An example web page 400 is shown in FIG. 4, as generated on a display of terminal 148. That is, web page 400 has been transmitted from server 104 (using interface module 200, which can include the necessary computer readable instructions to implement a web server) to terminal 148 in response to an earlier request from terminal 148. Web page 400 includes an identification 404 of the "job" (that is, the particular conversion activity of subcomponents 140 to finished good 144), as well as a name 408 of the job. Web page 400 can additionally include a field 412 into which a manufacturing date is entered, and a selectable element 416 (such as a virtual button). The request received at block 305 is generated at terminal 148 as a result of input data having been received at terminal 148 representative of a date entered in field 412, followed by a selection of button 416. Such input data can be received from a keypad, touch screen or the like connected to terminal 148. It is contemplated that field 412 can also be completed automatically, for example at terminal 148 by automatically inserting the current date. Field 412 can be omitted in some examples. For instance, as will be seen below, the manufacturing date of finished good 144 need not be used in the generation of a lot code, and can therefore be omitted. In other examples, the date entered in field 412 can be used in the generation of a lot code and/or expiry date.

The request transmitted by terminal 148 can therefore include the manufacturing date and the job ID shown in FIG.

4. In other examples, an identifier for finished good 144 itself could be included instead of, or in addition to, the job identifier. Having received the request at block 305, processor 108 is configured to extract or derive an item identifier (that is, an identifier of finished good 144). In the present example, the manufacturing date of Apr. 4, 2012 is included in the request. The item identifier can be obtained by accessing data store 152, which includes a record corresponding to the job identifier "12345" and containing an identifier for finished good 144. In the present example, it will be assumed that the identifier of finished good 144 is "FG144".

It is contemplated that in some examples, upon receipt of the request at block 305, processor 108 can be configured to authenticate the request using authentication module 204. Authentication module 204 can thus include a listing of identifiers for various terminals such as terminal 148, along with permissions associated with each terminal. If the originator of a request (in this case, terminal 148) is indicated in authentication module 204 as being forbidden from requesting lot codes and expiry dates, the request received at block 305 can be discarded. A message such as an error web page can be transmitted from server 104 to the originator of the request (terminal 148) indicating that the request has been denied. In the present example performance of method 300, however, it will be assumed that authentication was successful (that is, that terminal 148 is permitted to request a lot code and expiry date). In some examples, authentication of the request at block 305 can be omitted.

The nature of the request received at block 305 is not particularly limited. In some examples the request is generated automatically, either by terminal 148 or at server 104, when a job is scheduled in data store 152. The timing of the request is also not particularly limited. For example, the request can be transmitted, as mentioned above, when the job 12345 is scheduled at server 104, which may be several days prior to actual performance of the job. In other examples, the request can be generated at terminal 148 when production actually begins in connection with the job 12345 (that is, substantially in real-time with production).

Figure 5:
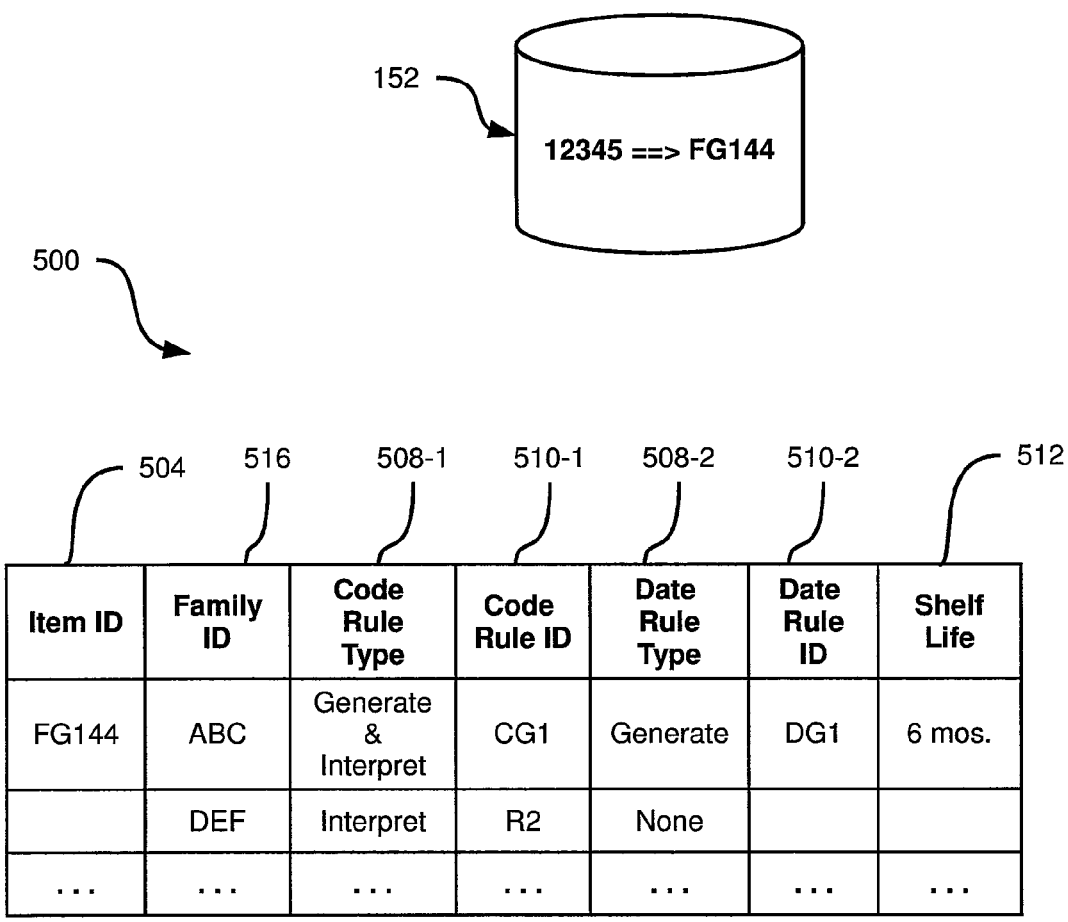
FIG. 5 depicts an item master table of the application of FIG. 2, according to a non-limiting embodiment.

Returning to FIG. 3, upon receipt of the request at block 305, processor 108 is configured, using item master module 208, to select one or more rule identifiers at block 310. In this particular example, in which the generation of a lot code and an expiry date have been requested, block 310 includes at least the selection of an identifier corresponding to a lot code generation rule. The selection of a lot code generation rule identifier is made based on the item identifier determined from the request received at block 305. An example item master table 500 comprised within item master module 208 is shown in FIG. 5. FIG. 5 also shows an exemplary portion of data store 152, from which processor 108 determines that the job identifier "12345" received with the request is associated with finished good identifier "FG144" (the above-mentioned kit).

As seen in FIG. 5, item master table 500 contains a listing of identifiers 504 for subcomponents 140 and finished goods 144 (although only finished good 144 is shown, for illustrative purposes), also generically referred to as "items", and identifiers of one or more rules from rules module 212 in association with each finished good identifier. The tabular format of item master table 500 is provided for illustrative purposes only, and it is contemplated that any suitable data structure may be used to store the data discussed below. Specifically, two rule type columns 508-1 and 508-2 are included in table 500, along with two rule identifier columns 510-1 and 510-2. In general, four types of rules are contemplated: code generation/interpretation rules, code interpretation rules, date generation rules and date interpretation rules. Each item identifier listed in table 500 can have one code rule (either generate/interpret or purely interpret) and one date (either generate or interpret) rule associated therewith.

Code generation/interpretation rules specify how a lot code is to be generated, and also specify how to interpret a lot code generated using the same rule. Code interpretation rules specify only how to interpret a lot code—these can be used for items which are identified by legacy lot codes that no longer need to be generated. Code interpretation rules can also be used to interpret lot codes generated at another production site or other manufacturing entity and received at system 100, such that system 100 need only "read" such codes, rather than generate them. Indeed, system 100 may not have access to sufficient data for generating such legacy or other-entity codes. Date generation rules specify how to generate an expiry date for an item, while date interpretation rules specify how to interpret an expiry date to derive a manufacturing date for an item. In the present example, item ID "FG144" is associated with the code rule identifier "CG1" (of the type generate/interpret) and with the date rule DG1 (of the type generate). Item master table 500 also includes a shelf life parameter 512 in association with each finished good identifier.

Item master table 500 can also include a family identifier 516, which can be assigned to a group of items. As seen in the second row of item master table 500, a rule identifier can be stored in association with a family identifier absent an item identifier. In such a case, if no other rule identifier is contained within item master table 500 for a given item identifier, the rule associated with that item's family identifier can be selected at block 310. In some examples (not shown in FIG. 5), item master table 500 can also include a customer ID. It is contemplated that production site 132 can be used to produce goods for a variety of entities (e.g. natural persons or corporations), each associated with various items and rules. In the present example, it is contemplated that the modules shown in FIG. 2 are replicated once for each customer entity, thus separating the data stored in memory 112 with respect to each entity. However it is possible to store the data of multiple entities in the same instance of a module and to achieve the required distinction by using a customer identifier.

The performance of block 310 by processor 108 thus includes accessing item master table 500 to retrieve one or more rule identifiers. In the present example performance of method 300, both a lot code and an expiry date were requested by terminal 148, and thus rule identifiers "CG1" and "DG1" are selected by processor 108 at block 310.

Returning to FIG. 3, the performance of method 300 continues at block 315, at which processor 108, using rules module 212, is configured to generate a lot code based on the rule identifier selected at block 310. Turning to FIG. 6, a portion of rules module 212 is shown, comprising the rule identified by the identifier "CG1". Thus, processor 108 is configured to access rules module 212 to retrieve the data shown in FIG. 6 during the performance of block 315.

As seen in FIG. 6, rule CG1 includes definitions of one or more lot code fragments. The particular example shown in FIG. 6 includes two fragment definitions, indicated as columns 600 and 604 (the formatting of fragments 600 and 604 as columns in a table is for illustrative purposes only—the table of rule CG1 shown in FIG. 6 could be transposed, or rule CG1 could be maintained in memory 112 using a format other than a tabular format). Each fragment includes various parameters, specifying the order of that fragment in the lot code, a name for the fragment, a data type, an identifier of a reference table, an identifier of a column in that reference table, and a length. Processor 108 is configured to generate each fragment using rules module 212 and reference tables module 216, based on the parameters included in the definition for each fragment.

In the example shown in FIG. 6, the first fragment to be generated corresponds to the earliest date of manufacture of the subcomponents of finished good 144. Processor 108 is therefore configured to retrieve, from data store 152, the identifiers of the subcomponents 140 used in the production of finished good 144. Continuing with the present example, those are subcomponent 140*a* (the cream) and subcomponent 140*b* (the lipstick). Having retrieved the identifiers of the relevant subcomponents, processor 108 is then configured to retrieve, again from data store 152, the lot codes of the particular lots of subcomponents 140*a* and 140*b* being used in job 12345. As will be seen below, those lot codes are processed by processor 108 to generate the first fragment of rule CG1.

It is contemplated that in other examples, the lot codes of subcomponents 140*a* and 140*b* associated with the job 12345 need not be retrieved in isolation. Indeed, it is not necessary for the job 12345 to have particular lot codes of subcomponents 140 associated therewith in data store 152. More generally, the subcomponent lot codes retrieved at this stage are those expected to be used in production, during the performance of the job 12345. The identification of which subcomponent lots are "expected" to be used can be made in various ways. For example, processor 108 may be configured to retrieve all lot codes for subcomponents 140*a* and 140*b* from data store 152 (thus covering all lots subcomponents 140*a* and 140*b* at production site 132, or even all lots at production site 132 and additional production sites). In other examples, specific lot codes for subcomponents 140*a* and 140*b* can be retrieved based on one or more "move" transactions recorded in data store 152. A move transaction comprises data representing a physical movement of inventory within production site 132; thus, one such transaction may include data representing the movement of three lots of subcomponent 140*a* and one lot of subcomponent 140*b* from a storage location at production site 132 to production line 136. The above considerations define the "scope" of the performance of method 300. The scope can be defined in the request received at block 305, as will be discussed in greater detail below.

In the present example, it will be assumed that the lot code of subcomponent 140*a* is "20010059", and that the lot code of subcomponent 140*b* is "20050059". Processor 108 is configured to determine the manufacturing date of each subcomponent 140 from the retrieved lot codes, using a lot code interpretation rule. Thus, processor 108 can be configured, either during the performance of block 315 or earlier in the performance of block 310, to select a rule identifier from item master table 500 associated with each subcomponent 140 (it will be recalled that the relevant subcomponents can be determined from data store 152, which specifies which subcomponents 140 are used in the manufacture of which finished goods 144). In light of the discussion above of the various rule types, the "lot code interpretation rule" mentioned in this paragraph can be a rule of either the generate/interpret type, or the interpret-only type, depending on whether the subcomponent lot codes must also be generated by server 104 (outside the scope of the current performance of method 300).

A lot code interpretation rule can include parameters to be used by processor 108 in interpreting a lot code to extract a manufacturing date therefrom. The parameters included in a lot code interpretation rule include a start position of a fragment to read from the input lot code, the length of the fragment to be read, and an identification of the format in which the fragment is presented. Thus, in the present example, the lot code interpretation rule associated with subcomponents 140*a* and 140*b* specifies a fragment with a length of four characters and a start position of "1" (that is, the first character of the lot code). Thus, processor 108 is configured to generate the fragment "2001" from the first lot code mentioned above, and the fragment "2005" from the second lot code. In other words, the remainder of the above-mentioned lot codes is not relevant to the manufacturing date of the particular lots of subcomponents 140*a* and 140*b*. In other examples, however, the remainder of the above-mentioned lot codes can be used to generate additional fragments. Such additional fragments could be generated as described herein, with the use of appropriate rules. In further examples, data can be extracted from subcomponent lot codes that will not be used directly in the generation of a finished good lot code. For example, a rule may be contained in rules module 212 that extracts the country of origin from a subcomponent lot code, and an identifier of that country may then be stored in item master table 500.

Having generated the fragments for interpretation, processor 108 is then configured to "translate" those fragments into dates, or in other words to extract a date from each fragment. The extraction is performed according to a translation parameter in the lot code interpretation rule which is similar to the parameter "reference column" shown in FIG. 6. Such a parameter refers to a particular column in a date table (also referred to as a master date table) in reference tables module 216.

Figure 7:
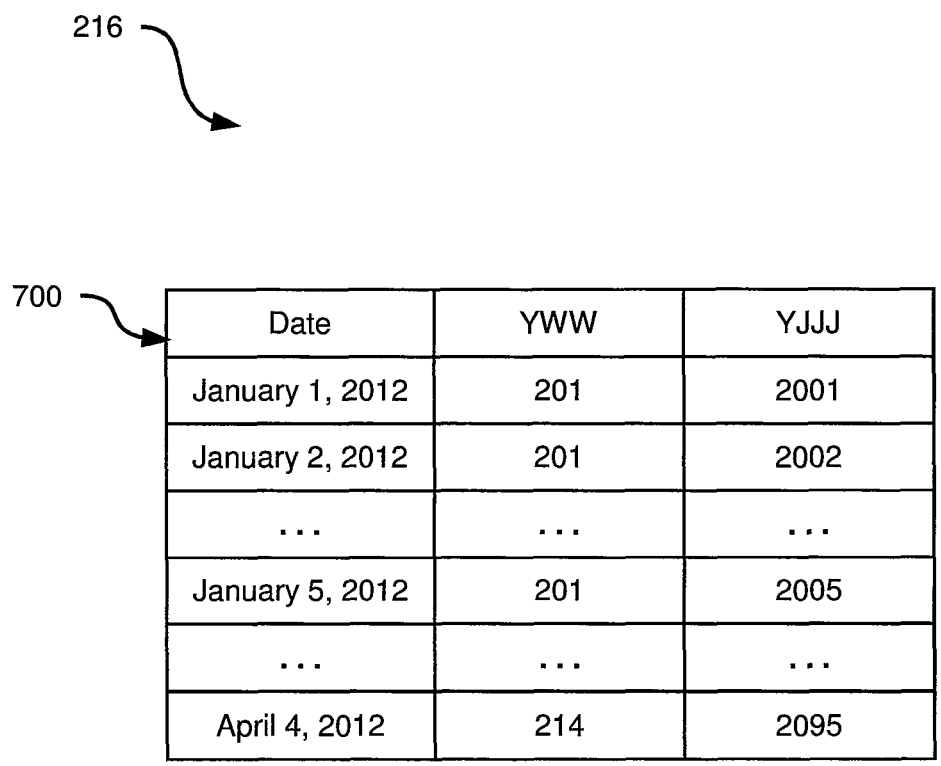
FIG. 7 depicts a date table of the application of FIG. 2, according to a non-limiting embodiment.
Figure 8:
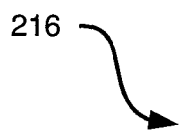
FIG. 8 depicts a site code table of the application of FIG. 2, according to a non-limiting embodiment.
Figure 8:
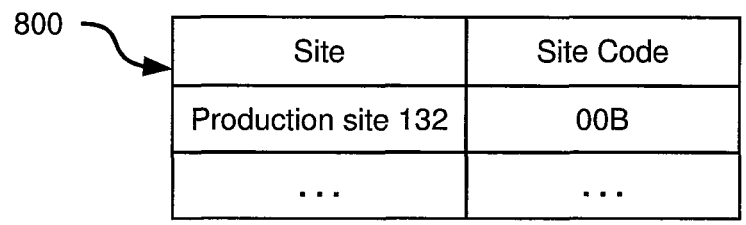

Turning to FIG. 7, an example date reference table 700 is shown within reference tables module 216. Table 700 includes a listing of various dates in the first (left-most) column, and additional columns each containing equivalent dates in other formats. Thus, the second column of table 700 includes equivalent dates in a "YWW" format consisting of three characters: the first character corresponds to the year in the current decade, while the second and third characters correspond to the week in the present year. Thus, Jan. 1, 2 and 5 in the year 2012 all have the same equivalent YWW value of "201", as all three dates are in the first week of the second year in the relevant decade (2010 to 2020). The third column includes equivalent dates in the format "YJJJ", where the first character is the year in the current decade, and the remaining three characters represent the number of the current day in the current year. Thus, Apr. 4, 2012 has a YJJJ value of 2095 because the year is the second year of the decade and April 4 is the 95$^{th}$ day of that year.

As noted earlier, the modules of application 114 are typically associated with a single entity or customer, with separate instances of each module being stored in memory 112 in association with different customer identifiers. As a result, the performance of method 300 can be based only on the modules or portions of modules which are associated with the same customer identifier as finished good 144. However, certain portions of modules, or entire modules, can also be shared between customers. Date table 700, for example, can be shared across production site 132, such that only a single instance of date table 700 exists in server 104. Such sharing can be indicated by storing a plurality of customer identifiers in memory 112 in association with table 700. In another example, the absence of any customer identifiers stored in association with a module of portion of a module can indicate that the module or portion is shared (that is, available for any performance of method 300, irrespective of which finished good 144 that performance relates to).

Returning to the performance of block 315, processor 108 is configured to refer to table 700 based on the translation parameter in the lot code interpretation rule discussed above. In the present example, the translation parameter specifies the YJJJ format, and processor 108 thus performs a comparison between the fragments of the subcomponent lot codes and the third column of table 700 to determine the manufacturing dates of subcomponents 140a and 140b, and then selects the earliest date. As will now be apparent, the manufacturing date of subcomponent 140a is Jan. 1, 2012, which is earlier than the manufacturing date of subcomponent 140b (Jan. 5, 2012).

It is contemplated that if the subcomponent lot codes include manufacturing dates in a format that does not specify a particular day (for example, the YWW format) processor 108 can be configured to assume the earliest day among the possible days indicated by the subcomponent manufacturing date.

Having determined the earliest subcomponent manufacturing date, processor 108 is then configured to complete the generation of the first fragment defined by rule CG1. Referring again to FIG. 6, the first fragment definition of rule CG1 includes data type and reference table parameters which refer to date reference table 700. The first fragment definition also includes a format parameter "YWW", specifying that the earliest subcomponent manufacturing date determined as a result of the presence of the data type parameter is to be converted to the YWW format using reference tables module 216.

Processor 108 is therefore configured to retrieve, from table 700, the date equivalent to the earliest subcomponent date of manufacture (Jan. 1, 2012) in the YWW format. Processor 108 thus accesses table 700 and retrieves the data "201" from the second column of table 700. The first fragment of the lot code for finished good 144 is thus the value "201".

Processor 108 is then configured to determine if any fragments remain to be generated, and when the determination is affirmative, as is the case in this example, to generate the next fragment. Referring again to FIG. 6, the second fragment defined by definition 604 of rule CG1 is a site fragment, based on an identifier of production site 132, where job 12345 is being performed. Thus, the second fragment includes data type and reference table parameters which refer to a site code table within reference tables module 216. An example site code table 800 is shown, in which production site 132 is listed in association with an equivalent site code for use in lot codes. In particular, the equivalent site code for production site 132 is "00B". The nature of the site code is not particularly limited, and "00B" is provided purely for illustrative purposes—a wide variety of site code formats can be used. Thus, the second fragment is "00B". Processor 108, repeating the determination as to whether any fragments remain, would determine that no fragments remain in the present example performance of method 300 since rule CG1 contains only two fragment definitions, and would thus advance to block 320 of method 300.

Returning to FIG. 3, at block 320 processor 108 is configured to concatenate the fragments generated at block 315 to generate the full lot code.

Thus, in the present example performance of method 300 processor concatenates the first and second fragments generated based on fragment definitions 600 and 604, to generate the lot code "20100B". The final lot code is also stored in memory 112, for example in data store 152 in association with the job identifier 12345.

Figure 9:
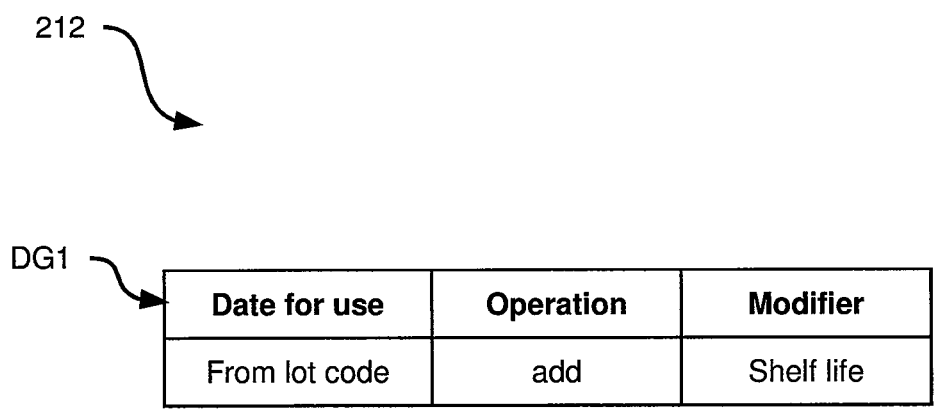
FIG. 9 depicts a date rule definition of the application of FIG. 2, according to a non-limiting embodiment.

Processor 108 is then configured to perform block 325 of method 300, at which an expiry date is generated according to expiry date generation rule DG1 as seen in FIG. 5. The identifier for rule DG1 can be retrieved at block 325, or can be retrieved earlier, at block 310, and retained for later use at block 325 (for example, in a volatile component of memory 112, such as RAM). An example of rule DG1 is shown in FIG. 9. In particular, rule DG1 includes three parameters: a "start" date from which to begin the generation of an expiry date; an operation to be performed on the start date, and a modifier to use in the operation.

In particular, as shown in FIG. 9, rule DG1 specifies that the expiry date for finished good 144 is generated by adding shelf life parameter 512 to a date interpreted (or determined) from the lot code for finished good 144. The performance of block 325 by processor 108 therefore involves the interpretation of the lot code generated above to retrieve the relevant "start" date, and also involves the shelf life parameter 512 contained in item master table 500. In other examples, rule DG1 could include parameters in addition to shelf life, such as an indication as to whether or not the computed expiry date should be rounded (for example, to the last day of the previous month).

In order to determine the "start" date, processor 108 is configured to retrieve the lot code "20100B" generated above from memory 112 and to interpret that lot code using a lot code interpretation rule in rules module 212. In the present example, the lot code interpretation rule is CG1, which is a lot code generation and interpretation rule. As described above in connection with the subcomponent manufacturing dates, the interpretation portion of rule CG1 specifies a fragment starting location and length, as well as a date format. In the present example, the interpretation portion of rule CG1 specifies a three-character segment beginning at the first character of the lot code, and also specifies that the segment is in a YWW format.

Processor 108 is therefore configured to retrieve the first three characters of the lot code—"201", and to determine from date table 700 that those characters correspond to the date of Jan. 1, 2012. Processor 108 is then configured to retrieve shelf life 512 for finished good 144 (6 months), and to evaluate rule DG1 to generate the expiry date of finished good 144. In the present example, the evaluation of rule DG1 results in an expiry date of Jul. 1, 2012, six months after the earliest manufacturing date of subcomponents 140 used in the production of finished good 144. Having generated the expiry date, processor 108 is configured to store the expiry date in memory 112, for example in data store 152 in association with the job identifier 12345.

Following the performance of block 325, processor 108 is configured, at block 300 of method 300, to transmit the generated lot code and expiry date to the originator of the request received at block 305. Thus, in the present example, processor 108 is configured to transmit, via NIC 120, the lot code "20100B" and the expiry date of Jul. 1, 2012 to terminal 148. Terminal 148 can then make use of the received data to print labels for finished good 144, for example. Processor 108 can also be configured to transmit the expiry date in a variety of formats (for example YYYY-MM-DD, DD/MM/YY, and the like). In some examples, terminal 148 can request a particular format in the request received at server 104 at block 305.

It is contemplated that although the above example performance of method 300 included the generation of both a lot code and an expiry date, other performances of method 300 can include the generation of only a lot code (omitting block 325), or only an expiry date (omitting blocks 315-320) when a lot code has already been generated. For example, the request received at block 305 may include a previously generated lot code.

A wide variety of lot code fragments, in addition to those discussed above, are contemplated herein. For example, the first fragment can be based on the manufacturing date of finished good 144 itself rather than on the earliest subcomponent manufacturing date. In other examples, both alternatives (based on the manufacturing date of finished good 144 and on the earliest subcomponent manufacturing date) can be included in the final lot code. In still other examples, the latest subcomponent manufacturing date can be selected for a fragment, rather than the earliest. In still other examples, either the rule or the request received at block 305 can specify particular subcomponents to consider when generating a lot code (for example, the request can specify that subcomponent 140*a* is not to be considered in determining the earliest subcomponent manufacturing date). Further examples of lot code fragments include sequential and/or random numbers retrieved from reference tables module 216 or generated by processor 108.

In another example, a lot code can be generated based on an expiry date. This can be used in the case of subcomponents 140 such as coupons, which typically do not have lot codes assigned to them at manufacture, but instead only have expiry dates (the final dates on which the coupons are valid). Thus, in order to track the coupons in data store 152, "artificial" lot codes can be generated by processor 108 based on the expiry date rather than a manufacturing date. In other examples, the expiry dates of coupons can be processed as subcomponent manufacturing dates as described above.

Reference tables module 216 can include tables in addition to those discussed above. For example, tables containing codes for particular production lines 136 or particular shifts of production (for example, morning, afternoon and night shift codes) are also contemplated.

Although the above example focused on the generation of a lot code and expiry date (including the interpretation of lot codes), additional functionality is contemplated within system 100 by way of the modules shown in FIG. 2 and discussed above.

For example, the date interpretation rules (both the interpretation portion of rule DG1 and the rule DI1) contained in rules module 212, although not used by processor 108 in method 300, can allow processor 108 to translate requests containing dates in various formats into dates for storage in memory 112. Thus, rule DI1 (or the interpretation portion of rule DG1) can specify that an expiry date received at processor 108 in a request from terminal 148 in connection with finished good 144 is in a YWW format. Processor 108 can thus be configured to evaluate rule DI1 and to retrieve the "actual" date corresponding to the received date in YWW format from table 700. Since a YWW value may be associated with several days, processor 108 can be configured to select the earliest matching date from table 700, and to store that date in memory 112 in association with finished good 144. Processor 108 can also be configured, in other examples, to select the latest matching date from table 700, or the earliest matching date that is a Monday, and the like. Other alternatives will also now occur to the person skilled in the art.

The date interpretation rules can also allow processor 108 to extract a manufacturing date of a finished good 144 from a lot code of the finished good 144. Lot codes and expiry dates, but not manufacturing dates, are stored in memory 112 in the present example. Thus, manufacturing dates can be obtained from expiry dates and lot codes. For example, a date interpretation rule can specify that the manufacturing date of finished good 144 is the expiry date (provided in a request or stored in memory 112) minus shelf life 512 for finished good 144.

Figure 10:
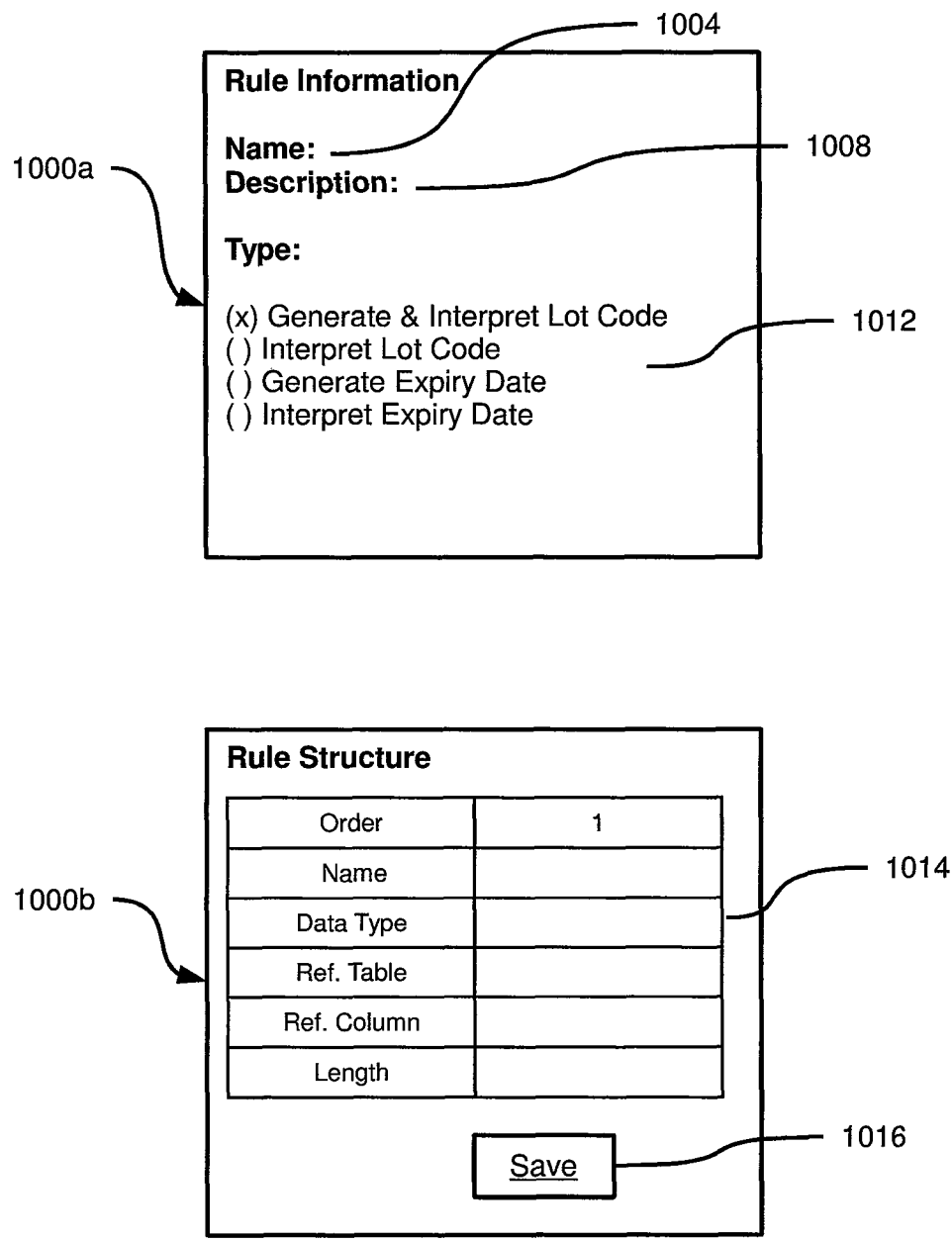
FIG. 10 depicts rule generation interfaces provided to the terminal of FIG. 1, according to a non-limiting embodiment.

Processor 108 is also configured to provide various interfaces to terminal 148 in connection with the generation of lot codes and expiry dates, and in connection with the maintenance of rules module 212 and reference tables module 216. Turning to FIG. 10, a rule creation interface 1000*a*, which may be transmitted to terminal 148 as a web page by processor 108 using interface module 200, is shown. Interface 1000*a* includes a name field 1004 and a description field 1008 for receiving, respectively, a name and humanistic description for the rule. Interface 1000*a* also includes selectable rule type elements 1012 for receiving a selection of the type of rule to be created. In the present example, the rule type "generate and interpret lot code" is selected.

Following an instruction from terminal 148 indicating that the desired entries have been made to interface 1000*a*, processor 108 can store the data entered in fields 1004 and 1008 and provide a further interface 1000*b* to terminal 148 via NIC 120 and network 124. Interface 1000*b* can include fields 1014 for receiving input data from terminal 148 to create a fragment definition. Fields 1014 can appear substantially as shown in FIG. 6, with certain fields being editable. For example, the "Name" field can receive text, while the "Data Type" can be a drop-down list containing options representing the various reference tables available. Thus, the "Ref. Table" field can be populated automatically once the "Data Type" field is completed, and the "Ref. Column" can be a drop-down list containing the various columns available within that reference table. A selectable element 1016 can be included to complete the rule. It is also contemplated that a further selectable element (not shown) can be included to add another fragment to the rule (that is, to provide another set of empty fields 1014).

Thus, processor 108 can receive data from terminal 148 to define a new rule, and save the new rule in memory 112 (particularly, in connection with rules module 212). The data received from terminal 148 can include selections of reference tables, columns from those reference tables (also referred to above as translation parameters), fragment names, operation identifiers (for expiry date calculation), and the like. Processor 108 can also be configured to receive sample data from terminal 148 and to generate a sample lot code, expiry date, or both based on the newly defined rule. The sample lot code and expiry date can be transmitted to terminal 148 as part of a web page or other interface, but are not stored in memory 112. It is thus contemplated that rules contained in rules module 212 can be created and modified by terminal 148 via the selection of various combinations of data available within application 114. Such rule creation and modification can be performed at any time by any terminal 148 (provided terminal 148 is successfully authenticated, if desired).

Other interfaces can also be provided to terminal 148 by processor 108. For example, FIG. 11 shows an interface 1100 for editing table 700. Interface 1100 can include selectable elements such as a "new column" element for editing the contents of table 700. Thus, additional date formats can be provided in table 700 upon which further lot code fragments can be based. Similar expansion and editing of other reference tables can also be enabled by processor 108, thus allowing terminal 148 to expand the available data for lot code and expiry date generation. Authentication module 204 can be used by processor 108 to determine whether terminal 148 is authorized to make changes to reference tables or rules.

Turning now to FIG. 12, a further web page or other interface 400-a is shown, representing the result of the performance of block 330 of method 300. Interface 400-a comprises interface 400 as discussed above, with the addition of the lot code and expiry date generated through the performance of method 300. Interface 400-a includes a representation 1200 of the lot code, and a representation 1204 of the expiry date generated by processor 108, for display at terminal 148. Terminal 148 can be configured to produce labels bearing the lot code and expiry date, for example by transmitting the lot code and expiry date to a label printer connected to network 124. Interface 400-a can also include, in some examples (not shown), a warning message or other indication when the expiry date generated via the performance of method 300 is below a certain threshold (that is, when the expiry date is less than a certain predetermined time period from the current date). Additionally, processor 108 can be configured to indicate in an additional web page which subcomponent is the "driving" subcomponent resulting in the expiry date determined by processor 108. It may be desirable to consume that subcomponent first during production, or even to dispose of that subcomponent if the resulting expiry date will not be sufficiently advanced into the future.

Although the performance of method 300 is described above in connection with a particular job, it is also contemplated that the method can be performed at times other than actual production of finished good 144. For example, when a shipment of subcomponent 140a is received at production site 132, it may be necessary to generate an expiry date for the received shipment. Terminal 148 can be provided with an interface (by processor 108 using interface module 200) for entering a lot code for subcomponent 140a, and processor 108 can generate an expiry date for that lot of subcomponent 140a in the manner described above. The expiry date so generated can be transmitted to terminal 148 in an interface similar to that shown in FIG. 12.

Terminal 148, if successfully authenticated, may be permitted to override the expiry date generated for the received shipment of subcomponent 140a. For example, if the lot code was provided by terminal 148 for the generation of an expiry date by processor 108, either or both of the lot code and the expiry date may be overridden if the lot code was entered incorrectly. Assuming terminal 148 is permitted, terminal 148 can therefore edit representations similar to representations 1200 and 1204 shown in FIG. 12, and the edited data can be transmitted to server 104 for storage. Authentication module 204 can be used to determine whether terminal 148 is permitted to make such override changes. In addition, item master table 500 can also include indications in connection with each item as to whether or not lot codes or expiry dates can be overridden for that item.

In general, it is contemplated that the structure of application 114 can be used to allow for the generation of a wide variety of output data (such as lot codes, serial numbers, expiry dates, best-before dates and the like) for items such as subcomponents and finished goods, based on selected combinations (stored in the form of rules) of other data available in system 100 about the items. In other examples, processor 108 can also be configured to retrieve data associated with items that is stored outside system 100—for example, at a server operated by a shipping entity that delivers items to production site 132.

Additional variations are contemplated. For example, date table 700 can include times (e.g. hour, minute), or processor 108 can be configured to determine the current time and include such time in the generation of a lot code during the performance of method 300. Thus, lot codes and other output data can be generated by processor 108 based on data that becomes available only once production has begun (such as the time at which production begins), as well as on data that is available prior to the start of production (such as subcomponent lot codes).

In further variations, as mentioned earlier, the request received at block 305 can specify the scope of the performance of method 300—that is, which data the performance of method 300 will be based on FIG. 13 shows an example interface 1300 provided to terminal 148 by server 104 using interface module 200. Interface 1300 includes an expected production date field 1304 for a given finished good 144. Interface 1300 also includes a plurality of selectable elements 1308, one of which can be selected at terminal 148 to determine the scope of processor 108's search for subcomponent lot codes during the generation of a finished good lot code and expiry date. The options shown are move transactions, inbound stock transfers (that is, incoming shipments of subcomponents), subcomponent lots already associated with the particular job (as discussed above in the performance of method 300), and all subcomponents present at production site 132 ("warehouse"). When a selection of one of elements 1308 is made, the selection is transmitted to server 104 and processor 108 can return a list of matching subcomponent lot codes 1312. One or more of the matching lot codes can be selected at terminal 148, and then displayed in field 1316. Terminal 148 can then send a request to processor 108 to continue with the generation of lot codes, expiry dates and the like, including the selected eligible subcomponent lot codes. In other examples, the selection of particular matching lot codes at terminal 148 can be omitted. Thus, terminal 148 need only identify a group of eligible subcomponent lot codes (such as the group defined by incoming shipments).

While system 100 is described above as a web-based environment, in which interface module 200 acts as a web server to terminal 148, any suitable client-server implementation can be provided.

In a further variation, it is contemplated that the data contained within the above-described modules can be exported into a format suitable for delivery to, for example, a new production site, and imported into a different instance of application 114 at the new site. Thus, an existing set of rules, tables and the like can be used to provision a new site from an existing site.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method for generating lot codes for items, the method comprising:

at a server comprising a memory, a network interface controller, and a processor interconnected with the memory and the network interface controller, receiving, from a terminal via the network interface controller, a request to generate a lot code for an item manufactured from at least one subcomponent, the request including one of a plurality of item identifiers for manufactured items;

from a plurality of lot code generation rules stored in the memory each corresponding to one of the plurality of item identifiers, automatically selecting one of the plurality of lot code generation rules that corresponds to the item identifier included in the request, the selected lot code generation rule including one or more lot code fragment definitions;

retrieving, from the memory, at least one subcomponent attribute corresponding to the at least one subcomponent;

retrieving data from at least one reference table stored in the memory, based on the lot code fragment definitions and the at least one subcomponent attribute;

generating one or more lot code fragments according to the one or more lot code fragment definitions of the selected rule using the retrieved data;

concatenating the generated lot code fragments to generate the lot code transmitting, via the network interface controller, the generated lot code to the terminal for printing the generated lot code.

2. The method of claim 1, further comprising:

automatically selecting one of a plurality of date generation rules from the memory based on the item identifier, the selected date generation rule including a date definition;

generating a date based on the selected date generation rule and the generated lot code.

3. The method of claim 2, further comprising:

storing the lot code and the date in the memory; and transmitting the date via a network interface controller to the terminal for printing the date.

4. The method of claim 1 wherein the request comprises a scope definition.

5. The method of claim 4 wherein the scope definition comprises an identification of a group of subcomponent lot codes including at least one subcomponent lot code for the at least one subcomponent corresponding to the at least one subcomponent attribute.

6. The method of claim 1, further comprising:

receiving, via the network interface, a rule comprising at least one lot code fragment definition from the terminal, the at least one lot code fragment definition comprising a selection of one of the reference tables and a translation parameter.

7. A server comprising:

a memory;

a network interface controller for communicating with a terminal; and a processor interconnected with the memory and the network interface controller, the processor configured to:

receive, from the terminal via the network interface controller, a request to generate a lot code for an item manufactured from at least one subcomponent, the request including one of a plurality of item identifiers for manufactured items;

from a plurality of lot code generation rules stored in the memory each corresponding to one of the plurality of item identifiers, automatically select one of the plurality of lot code generation rules that corresponds to the item identifier included in the request, the selected rule including one or more lot code fragment definitions;

retrieve, from the memory, at least one subcomponent attribute corresponding to the at least one subcomponent;

retrieve data from at least one reference table stored in the memory, based on the lot code fragment definitions and the at least one subcomponent attribute;

generate one or more lot code fragments according to the selected rule using the retrieved data;

concatenate the generated lot code fragments to generate the lot code; and transmit, via the network interface controller, the generated lot code to the terminal for printing the generated lot code.

8. The server of claim 7, the processor further configured to:

automatically select one of a plurality of date generation rules from the memory based on the item identifier, the selected date generation rule including a date definition; and generate a date based on the selected date generation rule and the generated lot code.

9. The server of claim 8, the processor further configured to store the lot code and the date in the memory; and to transmit the date to the terminal via the network interface controller for printing the date.

10. The server of claim 7 wherein the request comprises a scope definition.

11. The server of claim 10 wherein the scope definition comprises an identification of a group of subcomponent lot codes including at least one subcomponent lot code for the at least one subcomponent corresponding to the at least one subcomponent attribute.

12. The server of claim 7, the processor further configured to receive a rule comprising at least one lot code fragment definition from the terminal, the at least one lot code fragment definition comprising a selection of one of the reference tables and a translation parameter.

13. A non-transitory computer readable storage medium for storing computer readable instructions for execution by a processor, the computer readable instructions implementing the steps of:

receiving, from a terminal, a request to generate a lot code for an item manufactured from at least one subcomponent, the request including one of a plurality of item identifiers for manufactured items;

from a plurality of code generation rules stored in the memory each corresponding to one of the plurality of item identifiers, automatically selecting one of the plurality of code generation rules that corresponds to the item identifier included in the request, the selected rule including one or more lot code fragment definitions;

retrieve, from the memory, at least one subcomponent attribute corresponding to the at least one subcomponent;

retrieving data from at least one reference table stored in the memory, based on the lot code fragment definitions and the at least one subcomponent attribute;

generating one or more lot code fragments according to the selected rule using the retrieved data;

concatenating the generated code fragments to generate the lot code;

transmitting the generated lot code to the terminal for printing the generated lot code.

14. The non-transitory computer readable storage medium of claim 13, the method further comprising:

automatically selecting one of a plurality of date generation rules from the memory based on the item identifier, the selected date generation rule including a date definition; and generating a date based on the selected date generation rule and the generated lot code.

15. The non-transitory computer readable storage medium of claim 14, the method further comprising:

storing the lot code and the date in the memory; and transmitting the date via a network interface controller to the terminal for printing the date.

16. The non-transitory computer readable storage medium of claim 13 wherein the request comprises a scope definition.

17. The non-transitory computer readable storage medium of claim 16 wherein the scope definition comprises an identification of a group of subcomponent lot codes including at least one subcomponent lot code for the at least one subcomponent corresponding to the at least one subcomponent attribute.

18. The non-transitory computer readable storage medium of claim 1, the method further comprising:

receiving, via the network interface controller, a rule comprising at least one lot code fragment definition from the terminal, the at least one lot code fragment definition comprising a selection of one of the reference tables and a translation parameter.

* * * * *